United States Patent [19]

Kumata et al.

[11] Patent Number: 4,664,644
[45] Date of Patent: May 12, 1987

[54] FIBER REINFORCED PLASTIC DRIVE SHAFT AND METHOD OF MANUFACTURING THEREOF

[75] Inventors: Masataka Kumata, Kamiitabashi; Kazuo Emori, Asaka; Masahito Mitsumori, Tokyo; Hideo Watanabe, Kanagawa; Kazuaki Kobayashi, Odawara, all of Japan

[73] Assignees: Honda Giken Kogyo Kabushiki Kaisha; Yokohama Rubber Co., Ltd., both of Tokyo, Japan

[21] Appl. No.: 791,826

[22] Filed: Oct. 28, 1985

Related U.S. Application Data

[63] Continuation of Ser. No. 550,147, Nov. 9, 1983, abandoned.

[30] Foreign Application Priority Data

Nov. 16, 1982 [JP] Japan ............................ 57-200621
Jan. 21, 1983 [JP] Japan ............................ 58-008143

[51] Int. Cl.$^4$ .......................... B65H 81/00; F16C 1/00
[52] U.S. Cl. .................................... 464/180; 156/172; 428/36; 464/181
[58] Field of Search ............... 464/180, 181, 182, 183, 464/96, 87, 88; 428/36; 138/109, 130; 156/172, 169

[56] References Cited

U.S. PATENT DOCUMENTS 4,236,386 12/1980 Yates et al. ......................... 464/181
4,248,062 2/1981 McLain et al. ..................... 464/181

Primary Examiner—Michael Ball
Attorney, Agent, or Firm—Armstrong, Nikaido, Marmelstein & Kubovcik

[57] ABSTRACT

A fiber reinforced plastic drive shaft comprising a pair of metal joint members, an inner plastic layer extending over the entire length of the drive shaft and holding the metal joint members in both end portions thereof, and an outer plastic layer formed on the inner layer. The inner layer comprises continuous carbon fibers helically wound at 45-75 degrees to the axis of the drive shaft, while the outer layer comprises continuous fibers such as carbon fibers, glass fibers, polyester fibers and aramide fibers helically wound at 5-40 degrees to the axis of the drive shaft. The drive shaft has a greatly increased torsional strength and damping effect. The maximum damping effect is provided when the outer layer is formed only over the joint members.

21 Claims, 4 Drawing Figures

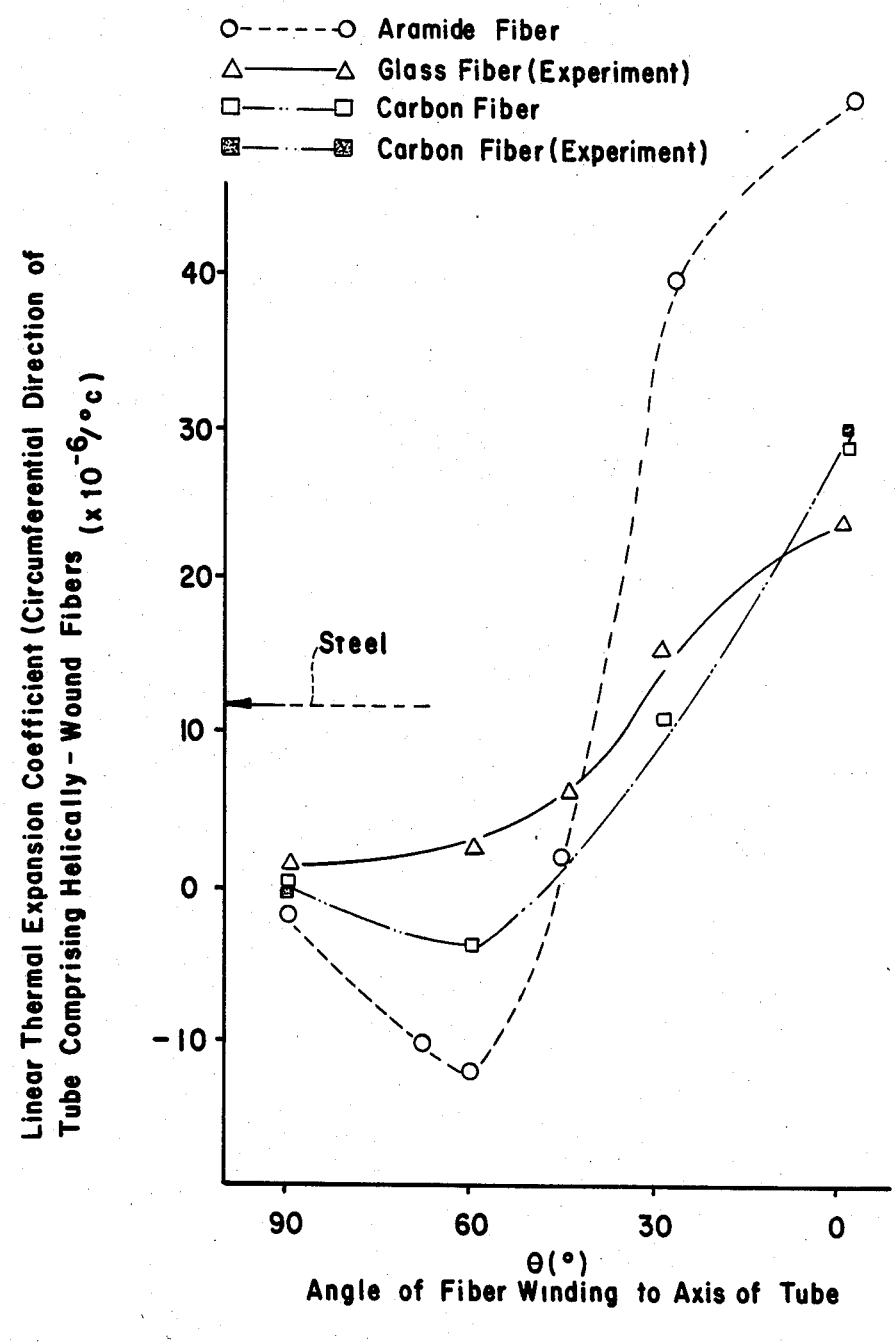

FIBER REINFORCED PLASTIC DRIVE SHAFT AND METHOD OF MANUFACTURING THEREOF

This is a continuation of application Ser. No. 550,147 filed Nov. 9, 1983, now abandoned.

BACKGROUND OF THE INVENTION

The present invention relates to fiber reinforced plastic drive shafts and a method of manufacturing thereof. More specifically, it relates to light-weight fiber reinforced plastic drive shafts capable of transmitting a large torque while effectively absorbing vibrations.

It has been known to the public that drive shafts of vehicles may be partly formed by light-weight fiber reinforced plastic tubes for reducing their weight. Plastic drive shafts of this kind are fiber reinforced plastic tubes having metal joints adhered to one or both ends therof, which joints are to be connected to driving shafts or driven shafts. When torque is transmitted through such a shaft, it tends to concentrate on the adhesive interfaces between the metal joints and the plastic tube. Accordingly, the adhesive interfaces are required to have sufficient torsional strength.

It is also desired that drive shafts have sufficient capability of damping vibrations in both axial and circumferential directions. Such damping effect of the drive shafts enables passengers to enjoy a better ride.

There are conventionally known a method of manufacturing a plastic drive shaft which comprises inserting joint members into the end portions of an uncured plastic tube, winding a tape around the outer surface of each end portion of the plastic tube to compress the plastic tube toward the joint member received therein, and curing the plastic at room or elevated temperatures. This plastic drive shaft, however, does not have sufficient torsional strength at the adhesive interfaces between the plastic tube and the joint members. In addition, the tape should be removed off after the curing, which makes this method lengthy.

Japanese Patent Application No. 57-98654 filed on June 9, 1982 by the same assignees is directed to a method of manufacturing a fiber reinforced plastic drive shaft comprising providing a pair of spaced tubular joint members on a mandrel, applying an adhesive onto the joint members, helically winding resin-coated continuous fibers around the joint members and the mandrel extending therebetween while rotating them integrally, helically winding resin-coated second fibers around portions of the resin tube at room or high temperatures while at the same time bonding the resin tube to the joint members. The compressing layer formed over the joint member contains continuous fibers wound at an angle of 80–90 degrees to the axis of the drive shaft, while the underlying plastic tube contains continuous fibers wound at 30–60 degrees, most preferably at 45 degrees. This fiber reinforced plastic drive shaft is, however, provided with a relatively thick compressing layer to show sufficient torsional strength at the interface between the joint member and the plastic tube. This is still a problem to be solved for the purpose of reducing the weight. Further, damping effect is not taken into consideration.

SUMMARY OF THE INVENTION

Therefore, an object of the present invention is to provide a fiber reinforced plastic drive shaft having not only a sufficient torsional strength at the adhesive interfaces between a plastic tube and metal joint members, but also sufficient capability of damping vibrations transmitted therethrough.

Another object of the present invention is to provide a method of manufacturing such a fiber reinforced plactic drive shaft.

The fiber reinforced plastic drive shaft according to the present invention comprises metal joint members separated from each other; an inner tubular plastic layer covering the above metal joint members and extending therebetween, which includes continuous carbon fibers helically wound at an angle of 45–75 degrees to the axis of the drive shaft; and an outer tubular plastic layer formed on the inner layer, which includes continuous fibers helically wound at such an angle that the outer layer has a larger radial thermal expansion coefficient than the inner layer.

The method of manufacturing a fiber reinforced plastic drive shaft according to the present invention comprises the steps of providing the metal joint members on a cylindrical mandrel; helically winding resin-coated continuous carbon fibers around the metal joint members and the cylindrical mandrel extending therebetween at an angle of 45–75 degrees to the axis of the mandrel to form an inner tubular layer; then helically winding resin-coated continuous fibers around the inner layer at the above-defined angle to form an outer tubular layer; heat-curing the resins; and thereafter removing the mandrel.

A drive shaft is subject to vibrations generated from various sources such as an engine, transmission gears, etc. Vibrations of the wheels generated due to the rough surface of a road are also transmitted to the drive shaft. It has been found that a carbon fiber reinforced plastic drive shaft can absorb such vibrations. Such ability of a plastic drive shaft, called hereinafter "damping effect," varies depending upon an angle of carbon fibers to the axis of the drive shaft. A carbon fiber reinforced plastic drive shaft exhibits a satisfactory damping effect when the angle of the carbon fibers to the axis of the drive shaft is 45–75 degrees, more preferably 50–65 degrees, and the winding angle of 60 degrees provides the drive shaft with the maximum damping effect.

Carbon fibers are, however, of anisotropic characteristics such that their linear thermal coefficient of expansion varies depending on the angle thereof to their axial direction. Specifically, a carbon fiber exhibits a much larger linear thermal coefficient of expansion in a direction perpendicular to its axis than in its axial direction. Due to such characteristics, when carbon fibers are helically wound at 45–75 degrees, particularly 60 degrees relative to the axis of the drive shaft, the inner tubular layer shows linear thermal expansion in its radial direction which is much smaller than even that of the metal joint member. This means that when the drive shaft is cooled to room temperature after heat-curing, the metal joint member shrinks to a larger extent than the overlying inner layer, leaving at the interfaces between the metal joint members and the inner layer such stress as to serve to separate them. Because of such remaining stress, the metal joint members and the inner layer tend to separate under torsional force, even though they are strongly bonded.

Such problems are overcome by forming an outer layer exerting an inward force on the interface. The outer layer contains continuous fibers helically wound at such an angle as to make the outer layer show larger linear thermal expansion than the inner layer in the radial direction. The larger linear thermal expansion coefficient of the outer layer makes the outer layer compress the inner layer when cooled to room temperature from a high curing temperature. As a result, the above stress at the interface between the metal joint member and the inner layer is cancelled by such a compressing force.

For this purpose, fibers helically wound in the outer layer should show larger linear thermal expansion in the circumferential direction than that of the carbon fibers helically wound in the inner layer, to such an extent that the compressing force of the outer layer can fully cancel the remaining stress at the interface between the metal joint member and the inner layer. Most preferable is that the radial thermal expansion of the outer layer is substantially the same as that of the metal joint member, leaving substantially no stress at the interface between the metal joint member and the inner layer.

The fibers which satisfy the above requirements are carbon fibers and other fibers such as glass fibers, polyester fibers and aramid fibers. Carbon fibers can be used because of their anisotropic characteristics. They are of great advantage in what winding operation can be carried out continuously from the formation of the inner layer simply by changing the winding angle.

The angle of fiber winding in the outer layer varies depending upon the linear thermal expansion coefficients of the fibers used. In general, the angle of fiber winding to the axial direction of the drive shaft is 5–40 degrees, and preferably 15–35 degrees. Specifically, when carbon fibers are used, the winding angle is 5–40 degrees, more preferably 15–30 degrees.

The outer layer may be formed over the length of the drive shaft. However, in view of the fact that maximum damping effect is provided when the carbon fibers are helically wound at 45–75 degrees, particularly 60 degrees in the entire shaft body extending between the joint members, the outer layer is preferably formed only on the joint member portions.

Helical winding of fibers provides any structure in which helical fibers oriented at a particular angle to the axis of the drive shaft are crossed with those oriented at the opposite angle. A net structure in which helical fibers are crossed with each other as if they are woven is preferable because of its mechanical characteristics. An alternative is a structure consisting alternately of layers of fibers helically wound in one direction and layers of fibers helically wound in the opposite directions.

The carbon fibers and other fibers used for the inner and outer layers may be in the form of monofilaments, strands, rovings, yarns, tapes, etc. Resins coated on the continuous fibers may be thermosetting polyesters, epoxy resins, acrylic resins, etc.

BRIEF DESCRIPTION OF THE DRAWINGS

FIG. 3 is a graph showing relations between the linear thermal expansion coefficients (circumferential direction) of tubes comprising various fibers helically wound) and the angles of those fibers to the axial direction of the tube.

DETAILED DESCRIPTION OF PREFERRED EMBODIMENT

Figure 1:
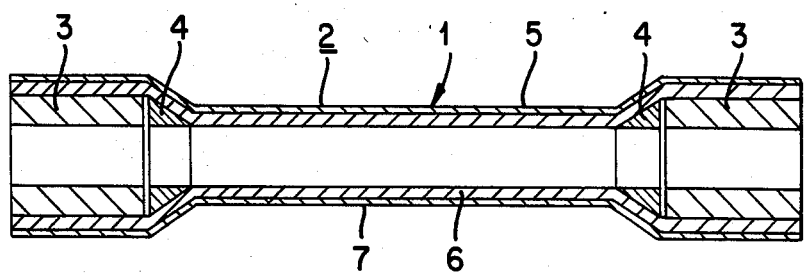
FIG. 1 is a cross-sectional side view of the fiber reinforced plastic drive shaft according to the present invention.

Referring to FIG. 1, the fiber reinforced plastic drive shaft 1 consists of a fiber reinforced plastic tube 2, a pair of tubular metal joint members 3, 3 coaxially provided in both end portions of the plastic tube 2, and a pair of auxiliary sleeves 4, 4.

Each joint member 3 has a splined inner surface that can be coupled to a driving shaft or a driven shaft. Each auxiliary sleeve 4, which is mounted inside each joint member 3, has a conical surface so that the plastic tube 2 has a diameter gradually increasing from a shaft body portion to a joint member portion.

The plastic tube 2 consists of an inner layer 6 formed by helically winding resin-coated continuous carbon fibers at an angle of 45–75 degrees, preferably 50–65 degrees to the axis of the drive shaft 1, and an outer layer 7 formed by helically winding resin-coated continuous carbon fibers around the inner layer 6 at an angle of 5–40 degrees, preferably 15–30 degrees to the axis of the drive shaft 1. In a preferred embodiment, the carbon fibers are helically wound at 60 degrees in the inner layer 6 and at 30 degrees in the outer layer 7. In such a case, the inner layer 6 shows the maximum damping effect while the outer layer 7 shows thermal expansion substantially on the same level as that of the metal joint member 3 made of steel, as shown in FIG. 3. Due to the difference in radial thermal expansion between the inner layer 6 and the outer layer 7, the inner layer 6 is compressed by the outer layer 7 when cooled to room temperature from a high curing temperature. Such compressing force serves to cancel a stress at the interface between the metal joint member 3 and the inner layer which works so as to separate them. As a result, an extremely small amount of stress, if any, remains at such interface, increasing the torsional strength of the plastic drive shaft 1. In addition, the drive shaft of this structure can effectively absorb vibrations transmitted therethrough so that passengers can enjoy a good ride.

Thus, the torque applied to one of the joint members 3 is transmitted through the shaft body 5 to the other joint member 3 while damping vibrations effectively. Since the interfaces between the joint member 3, 3 and the auxiliary sleeves 4, 4 and the inner layer 6 have been made stronger, larger torque can be transmitted without increasing the total weight of the drive shaft 1.

In another preferred embodiments, the outer layer 7 is formed only over the joint member 3, 3 and their vicinity. The drive shaft of this structure exhibits the maximum damping effect without suffering from any problem with weak interfaces between the joint members 3, 3 and the inner layer 6 because the shaft body 5 is constructed only by the inner layer 6 containing carbon fibers helically wound at 45–75 degrees, most preferably 60 degrees while both joint member portions are reinforced by the outer layers 7.

In a further embodiment, the outer layer 7 is formed by other continuous fibers than carbon fibers. Such fibers, when helically wound at an angle of 5–40 degrees, should exhibit a larger linear thermal expansion coefficient in the circumferential direction than that of the carbon fibers helically wound at 45–75 degrees in the inner layer 6. The outer layer 7 more preferably have substantially the same thermal expansion coefficient as that of the metal joint member 3 in ther radial direction. When glass fibers are used, for example, they are helically wound most preferably at about 30 degrees to the axis of the drive shaft 1 as shown in FIG. 3. And if aramide fibers are used, such angle would be most preferably about 40 degrees. With such fibers helically wound at appropriate angles, the outer layer 7 exerts a compressing force on the inner layer 6 so as to concel stress which would otherwise remain at the interface between the metal joint member 3 and the inner layer 6.

Figure 2A:
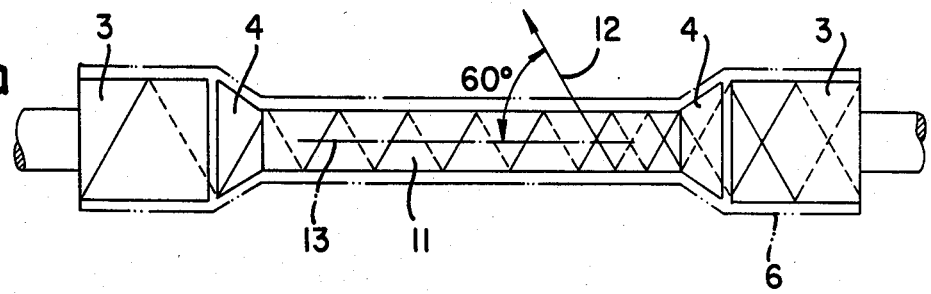
FIGS. 2(a) and (b) are views showing the steps of manufacturing the drive shaft.

The production of the plastic drive shaft 1 of the present invention will be carried out as follows:

Referring to FIG. 2(a), the joint member 3, 3 are mounted on a mandrel 11 spaced by a proper distance with the auxiliary sleeves 4, 4 each attached to the inner end of each joint member 3. The joint members 3, 3 and the auxiliary sleeves 4, 4 are coated with an adhesive.

While rotating the mandrel 11, means for supplying resin-coated continuous carbon fibers 12 is moved back and forth along the mandrel 11, so that the carbon fibers can be helically wound continuously around the joint members 3, 3, the auxiliary sleeves 4, 4 and the mandrel extending therebetween at an angle of 45–75 degrees, for example, 60 degrees to the axis 13 of the mandrel 11. Helically-wound carbon fibers are preferably formed into a net structure in which they are woven. Thus, the inner layer 6 of desired thickness is formed.

Figure 2B:
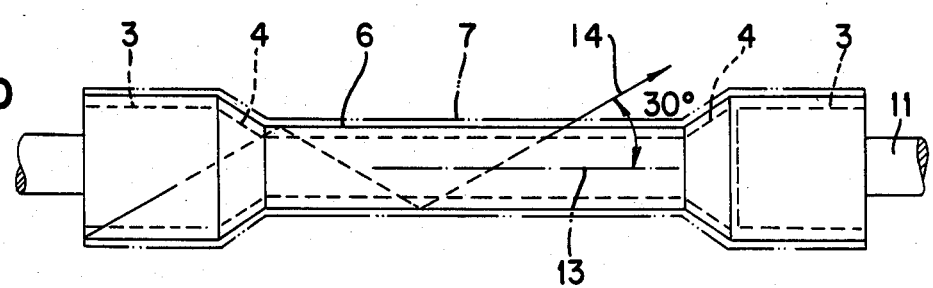

Next, as shown in FIG. 2(b), resin-coated continuous fibers 14 are helically wound around the inner layer 6 at an angle of 5–40 degrees by moving means for supplying the fibers 14 back and forth along the mandrel 11 while rotating the mandrel 11 in a proper speed relationship with the above fiber-supplying means. As mentioned above, the fibers 14 may be carbon fibers or other fibers such as glass fibers, polyester fibers, aramid fibers, etc. When carbon fibers are used, they are helically wound preferably at about 30 degrees, at which the outer layer 7 exhibits substantially identical thermal expansion to that of the joint member 3 made of steel as shown in FIG. 3. On the other hand, when other fibers are used, it should be noted that the angle of fiber winding varies depending upon the types of the fibers used. The optimum angle is about 30 degrees for glass fibers, and about 40 degrees for Kevlar (Du Pont's registered trademark) which is one type of aramide fibers. The continuous fibers in the outer layer are also preferably woven to a net structure.

The resins coated on the continuous fibers 12 and 14 are thermosetting polyesters, epoxy resins, acrylic resins, etc.

The resulting plastic tube 2 is then cured together with the adhesive at high temperatures, resulting in the drive shaft 1 having the joint members 3, 3, the auxiliary sleeves 4, 4 and the plastic tube 2 integrally bonded with each other. The mandrel 11 is finally removed from the resulting drive shaft 1.

When the resin tube 2 is heated for curing, the inner layer 6 containing carbon fibers helically wound, for example, at 60 degrees to the axis 13 is thermally expanded at minimum in its radial direction because of carbon fiber's anisotropic characteristics as shown in FIG. 3. On the other hand, the outer layer 7 containing, for example, carbon fibers helically wound at 30 degrees is thermally expanded as much as the joint members 3, 3. After completion of curing at high temperatures, the drive shaft 1 is cooled to room temperature. Because of their larger thermal extension, the metal joint members 3, 3, the auxiliary sleeves 4, 4 and the outer layer 7 shrink to a larger extent than the inner layer 6 when cooled. Thus, but for the outer layer 7, the adhesive interface between the joint member 3 and the inner layer 6 would be under such stress as to tend to separate them. However, the outer layer 7 compresses the inner layer 6 so that such stress is effectively cancelled. The remaining stress, if any, would be smallest. Therefore, the resistance of the interface to torsional force is greatly improved, resulting in the increase in torsional strength of the drive shaft 1.

The method in the above embodiment provides a plastic drive shaft comprising the outer layer 7 extending over the entire length of the drive shaft. If maximum damping effect is desired, however, the outer layer 7 would be forced only on the joint members 3, 3 and their vicinity. In addition, solid joint members may be used instead of tubular joint members. Each solid tubular member has a projection which is adapted to be splined onto a driving or driven shaft.

As mentioned above, the present invention provides a light-weight fiber reinforced plastic drive shaft comprising metal joint members and inner and outer layers, which has greatly increased torsional strength and damping effect. Further, such a drive shaft may be manufactured without difficulty, for example, without requiring such steps as the applying and removing of tapes.

It is readily apparent that the above-described fiber reinforced plastic drive shaft and method of manufacturing the same meet all of the objects mentioned above and also has the advantage of wide commercial utility. It should be understood that the specific form of the invention hereinabove described as intended to be representative only, as certain modifications within the scope of these teachings will be apparent to those skilled in the art.

Accordingly, reference should be made to the following claims in determining the full scope of the invention.

We claim:

1. A drive shaft comprising:
   (a) a pair of tubular metal joint members at each end of said drive shaft, said joint members having a tubular cross-section and being adapted to receive within the central portion thereof a coupling member;
   (b) a tubular shaft overlapping and connecting said metal joint members, comprising a cured resin containing an inner layer of helically wound continuous carbon fibers arranged at an angle of substantially 60 degrees to the axis of the shaft, said tubular shaft tightly overlapping said metal joint members, and outer layer of helically wound continuous reinforcing fibers arranged at an angle which results in a radial thermal expansion coefficient for the outer layer which is no less than the radial thermal expansion coefficient of the metal joint members.

2. A drive shaft according to claim 1, wherein the outer layer of said tubular shaft extends only over the portion of the tubular shaft overlapping the metal joint members.

3. A drive shaft according to claim 1, wherein the metal joint members are formed from a metal selected from the group consisting of iron, magnesium, titanium, beryllium, aluminum and alloys of these metals.

4. A drive shaft according to claim 1 wherein the reinforcing fibers are selected from the group consisting of carbon, glass and aramide fibers.

5. A drive shaft according to claim 1 wherein the metal joint members are formed from steel, and the reinforcing fibers are carbon fibers which are wrapped at an angle between 23 and 27 degrees relative to the axis of the drive shaft.

6. A drive shaft according to claim 1 wherein the metal joint members are formed from steel and the reinforcing fibers are glass fibers which are wrapped at an angle between 31 and 35 degrees relative to the axis of the drive shaft.

7. A drive shaft according to claim 1 wherein the metal joint members are formed from steel and reinforcing fibers are aramide fibers which are wrapped at an angle between 39 and 40 degrees relative to the axis of the drive shaft.

8. A drive shaft according to claim 1 wherein the metal joint members are formed from magnesium alloy, and the reinforcing fibers are carbon fibers which are wrapped at an angle between 0 and 3 degrees relative to the axis of the drive shaft.

9. A drive shaft according to claim 1 wherein the metal joint members are formed from magnesium alloy and reinforcing fibers are aramide fibers which are wrapped at an angle between 31 and 33 degrees relative to the axis of the drive shaft.

10. A drive shaft according to claim 1 wherein the metal joint members are formed from titanium alloy, and the reinforcing fibers are carbon fibers which are wrapped at an angle between 27 and 31 degrees relative to the axis of the drive shaft.

11. A drive shaft according to claim 1 wherein the metal joint members are formed from titanium alloy and the reinforcing fibers are glass fibers which are wrapped at an angle between 35 and 39 degrees relative to the axis of the drive shaft.

12. A drive shaft according to claim 1 wherein the metal joint members are formed from titanium alloy and reinforcing fibers are aramide fibers which are wrapped at an angle between 40 and 41 degrees relative to the axis of the drive shaft.

13. A drive shaft according to claim 1 wherein the metal joint members are formed from beryllium alloy, and the reinforcing fibers are carbon fibers which are wrapped at an angle between 16 and 24 degrees relative to the axis of the drive shaft.

14. A drive shaft according to claim 1 wherein the metal joint members are formed from beryllium alloy, and the reinforcing fibers are glass fibers which are wrapped at an angle between 22 and 32 degrees relative to the axis of the drive shaft.

15. A drive shaft according to claim 1 wherein the metal joint members are formed from beryllium alloy, and the reinforcing fibers are aramide fibers which are wrapped at an angle between 37 and 39 degrees relative to the axis of the drive shaft.

16. A drive shaft according to claim 1 wherein the metal joint members are formed from aluminum alloy, and the reinforcing fibers are carbon fibers which are wrapped at an angle between 2 and 6 degrees relative to the axis of the drive shaft.

17. A drive shaft according to claim 1 wherein the metal joint members are formed from aluminum alloy, and the reinforcing fibers are aramide fibers which are wrapped at an angle between 32 and 34 degrees relative to the axis of the drive shaft.

18. A drive shaft according to claim 1 wherein auxiliary sleeves in the shape of the frustrum of a cone, having an outer diameter at the base equal to the outer diameter of said metal joint members, are attached to said metal joint members on the joint members facing ends and wherein said tubular shaft is tapered in the region of said auxiliary sleeves to a smaller inner diameter than the diameter of that portion overlapping said joint member.

19. A drive shaft according to claim 15 wherein the inner diameter of said tubular shaft in the region between joint members is smaller than the outer diameter of said joint member.

20. The method for producing a drive shaft having a structure comprising a pair of tubular metal joint members at each end of said driven shaft, said joint members having a tubular cross-section and being adapted to receive within the central portion thereof a coupling member and a tubular shaft overlapping and connecting said metal joint members, comprising a cured resin containing an inner layer of helically wound continuous carbon fibers arranged at an angle of substantially 60 degrees to the axis of the shaft, said tubular shaft tightly overlapping said metal joint members, and an outer layer of helically wound continuous reinforcing fibers arranged at an angle which results in a radial thermal expansion coefficient for the outer layer which is no less than the radial thermal expansion coefficient of the metal joint members said method comprising:
(a) providing cylindrical metal joint members, spaced apart at a preselected distance, on a rotatable mandrel;
(b) helically winding resin-coated continuous carbon fibers around said metal joint members and said mandrel extending therebetween at an angle of substantially 60 degrees relative to the axis of the mandrel;
(c) helically winding resin-coated continuous reinforcing fibers around at least those portions of said carbon fibers overlying said joint members at an angle which results in a radial thermal expansion co-efficient for the cured fiber reinforced plastic layer which is no less than the radial thermal expansion co-efficient of the metal joint members;
(d) heat-curing said resins; and
(e) removing the mandrel from the formed drive shaft.

21. The method for producing a drive shaft having a structure comprising a pair of tubular metal joint members at each end of said drive shaft joint member having inner portions in the shape of the frustrum of a cone and a tubular shaft overlapping and connecting said metal joint members and having a smaller diameter between said conical portions than at said ends, said method comprising:
(a) attaching hollow auxiliary sleeves in the shape of the frustrum of a cone to cylindrical metal joint members to form composite joint members;
(b) providing a pair of composite metal joint members, spaced apart at a pre-selected distance, on a roatatable mandrel;
(c) helically winding resin-coated continuous carbon fibers around said metal joint members and said mandrel extending therebetween at an angle of substantially 60 degrees relative to the axis of the mandrel;
(d) helically winding resin-coated continuous reinforcing fibers around at least those portions of said carbon fibers overlying said joint members at an angle which results in a radial thermal expansion co-efficient for the cured fiber reinforced plastic layer which is no less than the radial thermal expansion co-efficient of the metal joint members;
(e) heat-curing said resins; and
(d) removing the mandrel from the formed drive shaft.

* * * * *